March 14, 1972 R. O. OSBORN 3,649,405
METHOD OF MAKING A LAMINATE WITH A MOVABLE INTERLAYER
Filed June 10, 1969 2 Sheets-Sheet 2
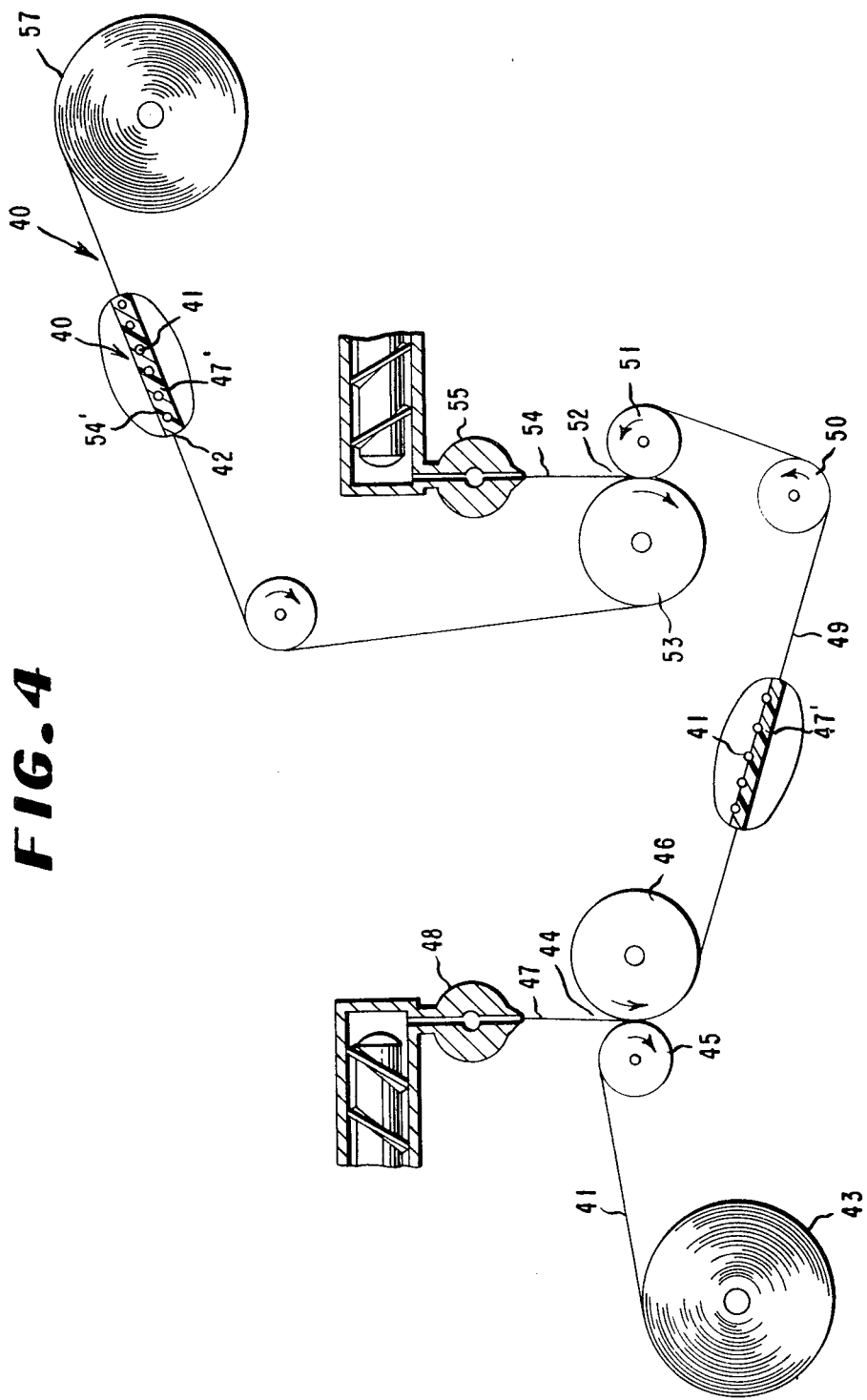
INVENTOR
ROBERT O. OSBORN
BY *Hoge T. Sutherland*
ATTORNEY › # United States Patent Office 3,649,405
Patented Mar. 14, 1972

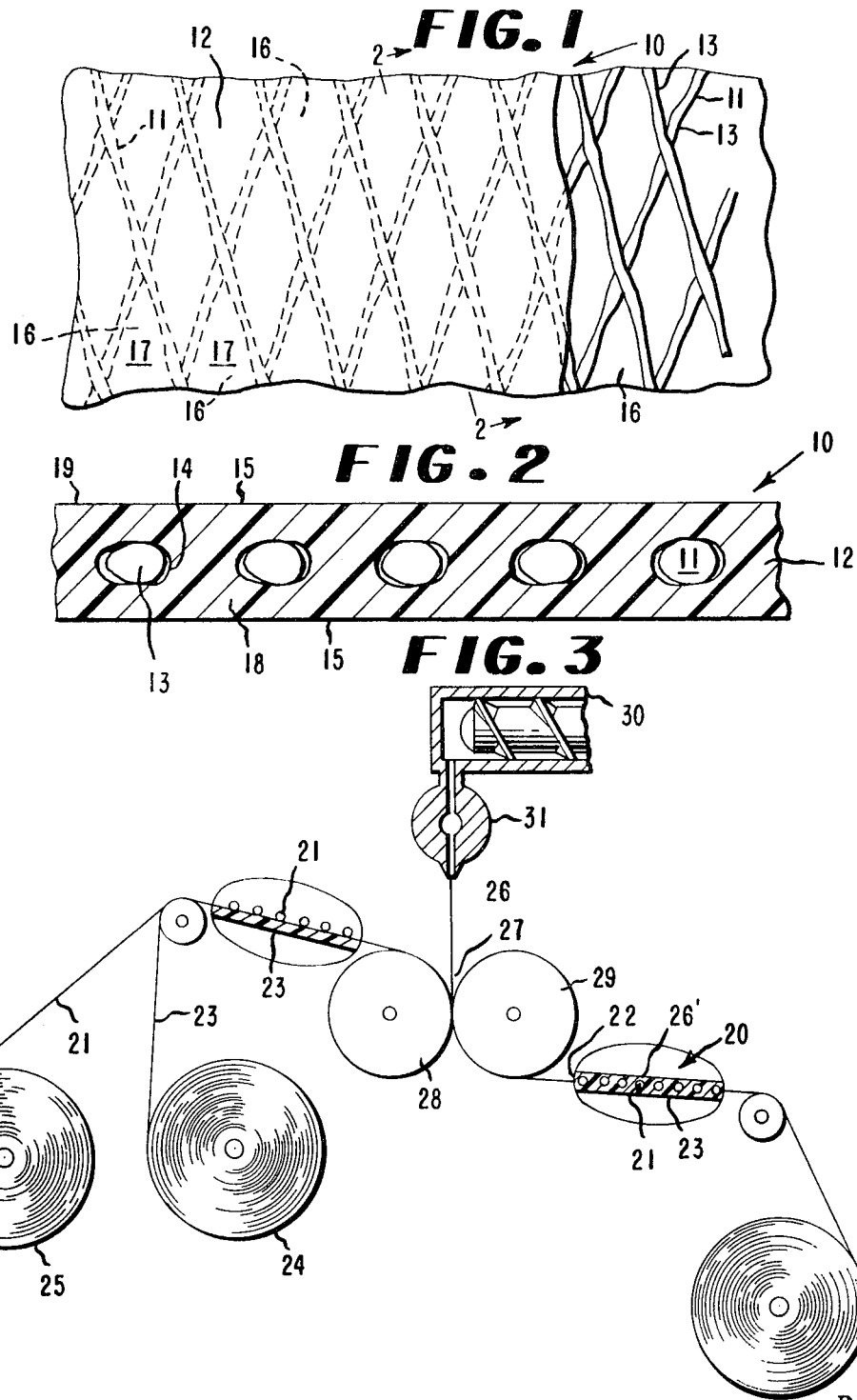

3,649,405
METHOD OF MAKING A LAMINATE WITH A MOVABLE INTERLAYER
Robert O. Osborn, Snyder, N.Y., assignor to E. I. du Pont de Nemours and Company, Wilmington, Del.
Filed June 10, 1969, Ser. No. 831,970
Int. Cl. B29c 19/00
U.S. Cl. 156—244                                    4 Claims

ABSTRACT OF THE DISCLOSURE

A heat shrinkable material comprising an oriented plastic open-mesh netting member which is completely enclosed within a plastic film member, with the netting member not being fixedly secured to the film member whereby the netting member may move relative to the film member during tearing, for example. When the material is shrunk, it will shrink substantially uniformly due to the orientation of the netting member. Methods are provided for making this material.

BACKGROUND OF THE INVENTION

(1) Field of the invention

This invention is a material comprising a heat shrinkable plastic netting member with oriented strands and movably and completely enclosed with a plastic film member and includes methods of making this material.

(2) Description of the prior art

Heat shrinkable materials are commonly used to package articles, such as toys and golf balls. This type of packaging material has proven to be entirely satisfactory when packaging a small article or articles but is deficient when packaging a heavy article or articles.

Recently, the packaging uses of this type film have been extended to include beer, canned food products in trays, heavy pallet loads of goods in carton form and the like. These uses require that the packaging material have a considerable degree of impact strength and be resistant to tearing in addition to being heat-shrinkable. Such properties in a packaging material, prior to this invention, were achieved mainly by increasing the packaging material thickness or by laminating two or more films, together or films and fabric, until the desired strength level was attained.

U.S. Pat. 3,058,863 to Gaines et al. is exemplary of the prior art. It discloses a multi-ply, self-supporting, moisture-resistant and substantially moisture-impervious polyolefin structure comprising at least one ply of a poly-ethylene film bonded to at least one ply of a fibrous poly-alkylene fabric, which structure or laminate is suitable for heavy duty uses.

U.S. Pat. 2,851,389 to Lappala discloses a reinforced tear-resistant material consisting of two films of non-fibrous flexible synthetic resin adhered together with a permanently tacky adhesive and a grid of fibrous organic polymeric slightly twisted strands of multifilamentary roving embedded in the adhesive, the strands being slidable both lengthwise and sidewise in such adhesive to enhance tear strength.

U.S. Pat. 2,919,467 to Mercer discloses an extruded thermoplastic net-like fabric and method of making it and suggests laminating one fabric upon another under pressure and heat, or by cementing, and further suggests that these fabrics may be embedded or embodied in or laminated with sheet material of the same or different plastic from that of the extruded fabric.

These patents do not show, nor does the prior art show, the material of this invention with its oriented heat shrinkable netting member enclosed in a plastic film to provide a reinforced, uniformly shrinkable material, particularly suited for packaging uses.

SUMMARY OF THE INVENTION

The reinforced heat shrinkable material of this invention is particularly adapted for use in packaging a heavy article or articles.

Briefly described, the material includes an oriented plastic netting member which is movably enclosed within a plastic film in a manner to reinforce it and to provide a strong, uniformly heat shrinkable material. Such material is characterized by the fact that there is no adhesion existing between the netting member and the film member.

The high tear-resistance properties of the material of this invention make it most useful in product bundling applications, for use as pallet overwraps, for capes and raincoats, for swimming pool covers and for general utility on construction sites, for example.

The problem in packaging heavy articles in a heat shrunk film is that the film tends to tear due to weight of the article or, in bundling applications, due to the shifting of the articles, particularly if the material is not shrunk uniformly about the article or articles.

The reinforced material of this invention solves these packaging problems by providing a strong reinforced heat shrinkable packaging material which shrinks uniformly.

Since an important feature of the material of this invention is the movability of the netting member within the film, methods of making the material are provided which accomplish this in a novel manner.

Such material making methods enclose the netting member within the film member while leaving it free to move within interior tunnels or channels defined by the film while forming the film member about the netting member under critical heat and pressure limits. Such methods are also a part of this invention.

BRIEF DESCRIPTION OF THE DRAWING

FIG. 1 is a greatly enlarged fragmentary plan view of the material of this invention, with parts broken away to show the netting member and the film member bottom portion with greater clarity;

FIG. 2 is an enlarged cross-sectional view of the material taken along line 2—2 of FIG. 1; and, FIGS. 3 and 4 are diagrammatic views of apparatus suitable for making the material of FIGS. 1 and 2.

DESCRIPTION OF THE PREFERRED EMBODIMENT

Referring to the drawing, a novel material 10 of this invention, as shown in FIGS. 1 and 2, comprises a heat shrinkable plastic netting member 11 movably and completely enclosed within a plastic film member 12.

The netting member 11 consists of a plurality of interconnected strands 13 and is in the form of an open-mesh self-sustaining sheet or web. The netting member 11 is oriented in both axial and radial directions whereby, upon application of heat, it will shrink substantially uniformly.

The film member 12 of the material 10 has a plurality of tunnel-like strand receiving cavities or channels 14 for receiving the strands 13 of the netting member 11. As later will be seen, these cavities of tunnels 14 are formed by the nonadhesion reaction of the strands 13 of the netting member 11 to the film member 12 in the manufacture of the material 10 as the film member 12 is formed about the strands 13 to enclose completely the netting member 11 in such film member. Accordingly, the configurations of the tunnels 14 closely approximate the configurations of the strands 13 they receive or contain, being only slightly larger than such strands 13 which generally define the tunnels 14. The film member 12, which preferably is nonoriented due to cost considerations, has outer surfaces 15 which constitute the external surfaces of the material 10 since all surfaces of the netting member 11 are completely covered by the film member 12.

It is important to note that no adhesive bond exists between the oriented plastic netting member 11 and the nonoriented plastic film member 12. The highly oriented strands of the heat-shrinkable netting member 11 which are thicker and cooler than the film member or portions 12 have no tendency to adhere to the as-cast and rapidly quenched film member 12 and easily move within the film member 12 when the netting member 11 is subsequently distorted by subjecting the material 10 to impact, shearing or tearing forces. The channels or cavities 14 surrounding the strands 13 of the thermoplastic netting 11 provide for the freedom of movement between the members which greatly increases the tear strength of the material 10, as will be explained further.

The netting member 11 preferably is fabricated from monofilament strands. Such netting member 11 can be cast on a grooved roll so as to mold the netting configuration and then stretch-oriented using conventional equipment or it can be directly extruded, such as by the method as disclosed in U.S. Pat. 2,919,467 to Mercer wherein monofilamentary strands are extruded from a set of dies having relative rotational motion such that the dies periodically unite with each other so as to form integrally extruded joints or strand intersections. The netting member 11 as thus extruded is then stretch-oriented so that it preferably has a capability for shrinking at least 10% in at least one axial direction.

As best seen in FIG. 1, the strands 13 define mesh openings 16 therebetween and the configuration of these openings is generally diamond-shaped or square-shaped. A typical diamond-mesh pattern is shown in FIG. 1. Material fabricated using diamond-mesh netting have greater heat shrinking capability in the longitudinal direction and are extremely tear-resistant in both the longitudinal and the transverse directions. The square-mesh pattern has a group of parallel strands crossing another group of parallel strands at substantially 90° to each other which comprise the warp and woof filaments of fabrics of this type except that the crossing strands are bonded to each other at each joint. Materials fabricated using square-mesh netting have more uniformly distributed shrinkage characteristics from the longitudinal to the transverse directions and are extremely tear-resistant along axes at angles to either of the major axes.

In consideration of economy of product it is preferred that the netting member 11 be fabricated from alpha-olefin monomers, such as ethylene, propylene, and copolymers thereof with other ethylenically unsaturated monomers copolymerisable therewith. The geometric proportions of the mesh of the netting member 11 are not critical. Netting having strand diameters in the 10 to 30 mil range, unit weights in the 1 to 3 grams/square foot range and mesh openings 16 of 1 to 4 strands per inch have been successfully employed in fabricating the reinforced materials of this invention.

It is preferred that the film member 12 be of a low cost, low density polyethylene having a density less than 0.930 gram per cubic centimeter and a melting point below about 115° C. or a flexible ethylene copolymer containing up to 25% ethylene/vinyl acetate copolymer resin.

In the finished material 10 of this invention, the netting member 11 serves as a means to control the shrinking of the material 10 whereby it shrinks in a substantially uniform manner. This is so irrespective of the shrinking propensities of the film member 12 which completely surrounds the netting member 11. As previously explained, the netting member 11 is oriented during its manufacture, so that it will shrink, or all of its strands will shrink, approximately the same amount upon application of heat. Being movably positioned within the tunnel system of the film member 12, the netting member as it shrinks uniformly carries with it the film member surrounding it. In other words, all parts, top and bottom and in-between, of the film member 12 go with the shrinking strands 13 of the netting member 11. This does not necessarily mean that the film member 12 itself shrinks evenly but it does mean that its dimensions after shrinking are determined by the dimensions of the netting member 11 after shrinking is finished.

The film member 12 surrounds all of the strands 13 and the joints of the open-mesh netting member 11 and fills all the openings 16 between the strands 13 in the mesh structure, as shown at 17, in FIGS. 1 and 2, but does not adhere to the stretch oriented strands 13. Further outer top and bottom portions or layers 18 and 19 of the film member 12 completely cover the tops and bottoms of the strands 13, as best seen in FIG. 2, and the channel network in the film member 12 permits relative movement to take place between the strands 13 and the film member 12.

It is this unexpected nonadhesive encasement of the stretch-oriented netting member 11 that causes the material 10 of this invention to have much higher tear strengths than do standard heat-shrinkable plastic materials of comparable composition and thickness and also to have a smooth attractive surface upon being heat shrunken. When the material 10 is heat shrunken, the nonoriented weblike film member 12 follows the strands 13 of the netting member 11 as they shrink and the film member 12 also shrinks to a degree due to the inherent "melt-memory" characteristics of nonoriented thermoplastic materials.

Tearing forces imposed on materials of this invention can pull netting strands for a foot or more from between the as-cast film member before resulting in a significant severance of the material. Such severances are preceded by greatly extended strands 13 in the netting member 11 and an accumulation of closely spaced strands in the area having the greatest concentration of opposing stresses resulting from the imposition of the tearing forces. The oriented strands 13 of the netting member 11 rearrange themselves, because of their lack of adhesion to the film member 12, to reinforce the areas being subjected to the greatest tearing forces. Materials of nonoriented netting that are adhered to or fused with one or more plastic film members do not so advantageously react to the imposition of tearing forces.

METHODS OF AND APPARATUS FOR MAKING THE MATERIAL

A preferred method of making the material of this invention includes the step of extruding a molten plastic material or film onto a first or upper surface of an oriented plastic netting member and into openings defined by the strands of the netting member and onto the inner surface of a plastic film member bottom portion or backing portion after which the molten film sets up and fuses with the film member bottom portion to form a film member which completely encloses the netting member, while preventing adhesion of the netting member to the film member. The above method is carried out under critical pressure and temperature ranges as will be further explained.

Referring to FIGS. 3 and 4, there is shown preferred apparatus A-1 and A-2 for making the material of this invention.

In FIG. 3, a material 20 of this invention made by the apparatus A-1 comprises a heat-shrinkable netting member 21 enclosed within a film member 22.

In making such material 20, a film member bottom portion or backing portion 23, in the form of a preformed polyolefin film or web, for example, and supplied from a film supply member bottom portion supply roll 24, and the heat-shrinkable netting member 21, also in web form and supplied from a netting supply roll 25, are combined with a layer of freshly extruded molten polyolefin material or film 26.

The molten material 26 is extruded onto the thermoplastic netting 21 and onto the film member bottom portion 23 through the openings in the netting member 21 as they enter a nip 27 formed by coating rotating surfaces of an elastomeric covered roll 28 and a metallic chill roll 29. The film member bottom portion 23 and the netting member 21 are passed over a portion of the elastomeric covered roll 28 in a wrinkle-free condition. Neither web need be under excessive longitudinal or transverse tension but, rather, just sufficient tension to insure that the two webs entering the nip 27 are in a wrinkle-free state.

The molten material 26 is supplied from an extruder and is extruded into film or stream form by an extrusion die 31. This continuous molten film 26 descends through an air gap until it contacts a first or upper surface of the netting member 21 and the inner surface of the film member bottom portion 23 through the openings in the netting member 21 in the nip area 27. The netting member 21, the film member bottom portion 23, and the molten film 26 are firmly pressed together between the elastomeric covered roll 28 and the chill roll 29 so that the molten film layer 26 is joined to or fused to the film member bottom portion 23 within the open mesh structure of the plastic netting member 21. The netting member 21 being oriented and at room temperature, no adhesion exists or occurs between the rapidly quenched film 26 and the plastic netting member 21 and no adhesion exists or occurs between the netting member 21 and the film member bottom portion 23 to which the molten film 26 or film member top potrion 26' is caused to adhere or fuse. The surface of the molten film 26 is chilled to a temperature below its solidification point to form film member top portion 26' while the film member bottom portion 23 and the film member top portion 26' are simultaneously being brought into contact with each other and caused to form a bond with each other.

It is important that the pressure and heat applied to combine or fuse the film member bottom portion 23 to the film member top portion 26' be such that the fibers of the netting member 21 do not cut these top and bottom portions of the film member 22 which are formed by such film member bottom and top portions 23 and 26. Nor should the heat be such as to damage the heat shrinkable strands of the netting member 21 or to cause premature shrinking of such netting member 21.

The formed reinforced material 20 may then be wound onto a windup roll 32 in a web-like condition suitable for slitting into widths of more convenient size or for forming wider webs by joining two or more reinforced webs 20 along their longitudinal edges, as is desired.

An alternate method of and apparatus for making the material of this invention is shown in FIG. 4.

In such apparatus, generally designated A-2, heat-shrinkable thermoplastic netting 41 is supplied from a netting supply roll 43 and is passed into a nip 44 formed by the contacting rotating surfaces of a nip roll 45 and a quench or chill roll 46. Molten first film 47 is extruded into the nip 44 from an extrusion die 48.

The molten film 47 passes through an air gap between the extrusion die 48 and the nip 44, contacts the heat-shrinkable netting member 41 in the nip 44 for a short interval of time before the molten film 47 is solidified or cured or set by the relatively cool surface of the quench roll 46 to form a film member bottom portion 47'. The molten film 47 when cast from low-density polyethylene is extruded at a temperature of about 280° C. and has very limited exposure to the thermoplastic netting 41 while it is in the molten state. It is immediately quenched to a temperature well below its solidification point which temperature is preferably about 50° C. when low density polyethylene is cast into molten film.

The exposure of the molten film 47 to the thermoplastic netting 41 in the nip 44 is purposely and critically limited so that the thermoplastic netting member 41 is not permitted to be heated to its heat-shrinking temperature and thus partially shrink and lose a substantial portion of its tensile strength. Further, the pressure exerted on the netting member 41 and the film member bottom portion 47' must be such that no damage occurs to the bottom portion due to cutting by the strands of the netting member 41.

The material thus leaving the surface of the quench roll 46 is a one-side coated thermoplastic netting member or partially formed material 49 consisting of the film member bottom portion 47' and a netting member 41. The coated netting member 49 is passed around an idler roll 50 and a nip roll 51 and into a nip 52 formed by the rotating coacting surfaces of the nip roll 51 and a quench roll 53. Molten second film 54 is cast into the nip 52 from an extrusion die 55 so that uncoated side of the coated netting member 49 is coated with the molten film 54. The molten film 54 is solidified by the quench roll 53 in the same manner as previously described to form a film member top portion 54' with the quenching taking place prior to the time that the one-side coated thermoplastic netting 49 is heated to near its heat shrinking temperature. This is critical because premature shrinkage of the heat set netting member 41 must be avoided.

The extruded molten film 54 or the film member top portion 54' as it sets up strongly bonds to or is fused with the previously-cast and solidified film member bottom portion 47' within the open portions of the thermoplastic netting member 41 to form film member 42. However, neither the molten film 47 nor the molten film 54 adheres to the strands of the oriented heat-shrinkable thermoplastic netting member 41 when the film member 42 of the heat-shrinkable material 40 is formed and the criticality of this has been explained. It should be noted that the film member 42 and, hence, the film member bottom and top portions 47' and 54' preferably are of nonoriented film.

As shown in FIG. 4, after formation the material 40 is general wound onto windup 57 for convenience prior to further processing.

The following examples show typical compositions and advantages of certain heat shrinkable reinforced materials of the present invention:

EXAMPLES 1–8

The heat shrinkable open-mesh thermoplastic netting member used in fabricating the following material examples all had biaxial heat shrinking capabilities of at least 10% before being used to fabricate the materials of the examples.

| Example No. | 1 | 2 | 3 | 4 | 5 | 6 | 7 | 8 |
|---|---|---|---|---|---|---|---|---|
| Type of netting | A | A | B | B | C | C | D | E |
| Strands/inch | 1.1 | 1.1 | 1.6 | 1.6 | 2.8 | 2.8 | 1.6 | 1.1 |
| Strand dia. mils | 24 | 24 | 21 | 21 | 12 | 12 | 15 | 21 |
| Grams/ft.² wt.[1] | 1.45 | 1.45 | 22.5 | 2.5 | 1.5 | 1.5 | 1.6 | 2.1 |
| Strand tensile, k.p.s.i. | 14 | 14 | 27 | 27 | 6 | 6 | 39 | 11 |
| Type of film member material. | F | G | F | G | F | G | G | G |
| Material, percent netting | 19 | 17 | 28 | 25 | 29 | 16 | 14 | 23 |
| Film gage, mils | 3 | 3.5 | 3 | 3 | 3 | 3 | 4 | 3 |
| Grams/ft.², wt | 9 | 9 | 10 | 9 | 9 | 8 | 12 | 9 |
| Tear,lbs./mil | 2 | 2 | 5 | 5 | 1 | 1 | 3 | 1 |
| Tensile, k.p.s.i. | 2 | 3 | 4 | 4 | 2 | 2 | 4 | 3 |
| Impact, kg./cm./mil | 9 | 8 | 16 | 35 | 10 | 8 | 6 | 11 |
| Bundle drops [2] | 6 | 9 | 9 | 10 | 5 | 4 | 3 | 5 |
| Percent Shrink,[3] | 8 | 8 | 13 | 6 | 44 | 20 | 6 | 2.5 |
| Percent TD Shrink [3] | 11 | 5 | 8 | 5 | 20 | 25 | 3 | 1.3 |

[1] This refers to the weight of the fully opened netting. The netting is always less than fully opened during the melt-coating operation used to fabricate the material of this invention.

[2] This refers to the number of times that a 20 pound bundle of magazines overwrapped in the heat-shrunken material of each example was dropped from a 2.5 foot height onto the bundle's corner and edges before the overwrap web burst along a seam.

[3] This shrinkage is the shrinkage of the material and is determined after immersion of the material in boiling water for 10 seconds. Actual shrinkage in commercial operation would be higher because the operating temperatures of commercial shrink tunnels are usually higher.

Legend showing type of netting and film member material.—A = Molded thermoplastic netting having highly oriented strands and unoriented joints. Net was molded from polyethylene having a 0.4 melt index and a 0.956 density; B = High tensile strength Du Pont Vexar® thermoplastic netting which was extruded with integral joints from Rexall polypropylene copolymer resin 43-S5 with a melt index of 5, a 2% random copolymer with ethylene in propylene. The extruded netting was drawn 6X so that all polymer, including that in the joints, was oriented; C = High shrink Du Pont Vexar® thermoplastic netting which was extruded with integral joints from polyethylene resin comprising 73% branched polyethylene with a melt index of 4 and a density of 0.914 and 27% linear polyethylene with a melt index of 0.4 and a density of 0.956. The extruded netting was drawn 6X so that all polymer, including that in the joints, was oriented, D = This netting was made like that of "B" in this legend except for the type of resin used which was Hercules Pro-Fax®6623E polypropylene having a melt index of 2.0 and density of 0.905; E = Garden net Du Pont Vexar® thermoplastic netting which was extruded with integral joints from polyethylene resin having a melt index of 0.45 and a density of 0.949. The extruded netting had unoriented joints and oriented strands; F = Ethylene/vinyl acetate copolymer resin containing 18% vinyl acetate and having a melt index of 2.5 was melt coated on the heat-shrinkable thermoplastic netting which was stretched over a 2 mil previously cast copolymer film using the method and appartaus shown in FIG. 3; G = These film member materials in the five examples were a low density polyethylene resin having a melt index of 2.2 and a density in the 0.920 to 0.930 range. In Examples 2, 4 and 6 the thermoplastic heat-shrinkable netting was placed adjacent to a web of 2 mil low density polyethylene and this double web layer was coated as shown in FIG. 3 with the low density polyethylene melt being adjacent the surface of the chill roll. In Examples 7 and 8 the above-described "G" coating or film member material was melt-coated onto both sides of the thermoplastic netting using the method diagrammatically shown in FIG. 4.

I claim:

1. A method of making heat shrinkable material consisting of a heat-shrinkable plastic netting member movably enclosed within a plastic film member including the steps of:

moving the netting member into a first nip formed by the coacting surfaces of a rotating elastomeric-surfaced roll and a rotating metallic-surfaced chill roll;

extruding a first molten plastic into the first nip and onto a first surface of the netting member and into the openings defined by the strands of the netting member;

chilling the first extruded plastic as it passes through the first nip to form a film member bottom portion;

feeding the film member bottom portion and the netting member together into a second nip formed by the coacting surfaces of a rotating elastomeric-surfaced roll and a rotating metallic-surfaced chill roll;

extruding a second molten plastic of composition that is comparable to that of the first plastic into the second nip and onto a second surface of the netting member and into the openings defined by the strands of the netting member; and chilling the second extruded plastic as it passes through the second nip and is pressed into contact with the film member bottom portion to form a film member top portion and to fuse it to the film member botto portion in the areas of the netting openings while the strands of the netting member are left freely movable within the film member top and bottom portions.

2. A method of making heat-shrinkable material consisting of a heat-shrinkable plastic netting member movably enclosed within a plastic film member including the steps of:

moving the netting member and a film member bottom portion into a nip formed by the coacting surfaces of a rotating elastomeric-surfaced roll and a rotating metallic-surfaced chill roll;

extruding a molten plastic of comparable composition to that of the film bottom member into the nip and onto a surface of the netting member and into openings defined by the strands of the netting member; and, chilling the extruded plastic as it passes through the nip and is pressed into contact with the film member bottom portion to form a film member top portion and to fuse it to the film member bottom portion in the areas of the netting openings while the strands of the netting member are left freely movable within the film member top and bottom portions.

3. The method of claim 1 wherein the netting member is oriented and the film member is nonoriented.

4. The method of claim 2 wherein the netting member is oriented and the film member is nonoriented.

References Cited

UNITED STATES PATENTS

| 3,186,893 | 6/1965 | Mercer | 156—179 X |
| 3,239,401 | 3/1966 | Beery | 156—179 |
| 3,284,268 | 11/1966 | Rösler | 156—179 X |

CARL D. QUARFORTH, Primary Examiner

S. J. LECHERT, Jr., Assistant Examiner

U.S. Cl. X.R.

156—85, 292, 309; 161—49